Nov. 18, 1958  W. R. FURCHES  2,860,719
COMBINATION VEHICLE STEERING AND WHEEL MOUNTING ARRANGEMENT
Filed Dec. 3, 1956  5 Sheets-Sheet 1

INVENTOR
WILLIAM ROY FURCHES
BY Cushman, Darby & Cushman
ATTORNEYS

Nov. 18, 1958 W. R. FURCHES 2,860,719
COMBINATION VEHICLE STEERING AND WHEEL MOUNTING ARRANGEMENT
Filed Dec. 3, 1956 5 Sheets-Sheet 2

INVENTOR
WILLIAM ROY FURCHES
BY
Cushman, Darby & Cushman
ATTORNEYS

Nov. 18, 1958  W. R. FURCHES  2,860,719
COMBINATION VEHICLE STEERING AND WHEEL MOUNTING ARRANGEMENT
Filed Dec. 3, 1956  5 Sheets-Sheet 4

INVENTOR
WILLIAM ROY FURCHES
BY Cushman, Darby & Cushman
ATTORNEYS

Nov. 18, 1958 W. R. FURCHES 2,860,719
COMBINATION VEHICLE STEERING AND WHEEL MOUNTING ARRANGEMENT
Filed Dec. 3, 1956 5 Sheets-Sheet 5

INVENTOR
WILLIAM ROY FURCHES

BY *Cushman, Darby & Cushman*
ATTORNEYS

United States Patent Office 2,860,719
Patented Nov. 18, 1958

2,860,719

COMBINATION VEHICLE STEERING AND WHEEL MOUNTING ARRANGEMENT

William Roy Furches, Pineville, La.

Application December 3, 1956, Serial No. 626,022

14 Claims. (Cl. 180—79.2)

The present invention relates to improvements in vehicle steering and wheel mounting arrangements and, more particularly, to an improved power steering and shock absorber mechanism for mounting the front trucks on vehicles, such as tractors and the like.

Present day farm tractors or the like are equipped with a pair of small closely spaced front wheels and a second pair of larger and widely spaced rear drive wheels. The closely spaced front wheels give the tractor added stability when driving over rough terrain, such as a plowed field, over tractors having but a single front wheel. The pair of front wheels sometimes are canted or toed in while other times are arranged in a generally parallel relationship with one another. Even though farm tractors are now provided with a pair of closely spaced front wheels for steering they are still known generally as a tricycle-type of vehicle. The present invention relates to the steering and mounting of the pair of front wheels of a tricycle-type of tractor, such as shown in the prior U. S. Patents No. 2,099,625 issued November 16, 1937 to Turney B. Roberts and William A. Howard; No. 2,301,152, issued November 3, 1942 to Walter F. Strehlow and No. 2,394,854, issued February 12, 1946 to Morris Goodman. These patents merely disclose the general arrangement of a tricycle-type of tractor having a pair of closely mounted front wheels of the type which the truck of the present invention is adapted for use.

An object of the present invention is to provide a combination type of power steerable and shock absorbing vehicle supporting truck for tractors or the like.

Another object of the present invention is to provide a steerable vehicle supporting truck for tractors or the like, having a pair of closely spaced front wheels, the closely spaced front wheels being capable of differential movement when the tractor is traveling over rough surfaces or uneven loads are applied to the pair of wheels.

Still another object of the present invention is to provide a steerable vehicle supporting truck for tractors, or the like, utilizing power steering apparatus, wherein the tractor operator's control or steering wheel may be placed at any convenient position on the tractor, such as on a fender, cowling or on the conventional steering post. In certain types of operation it is necessary for the driver to lean over the side of the tractor to see the operation being performed. Under these circumstances the driver must hang onto the steering wheel of the conventional type of steering for tractors and this creates a dangerous driving condition. By providing a tractor with a power steering arrangement of the present invention, the operator's control is capable of movement to any position on the tractor so that the operator may have the steering control mounted where it is most convenient.

Still another object of the present invention is to provide a power steering mechanism incorporated in the front truck of a tractor in which an accurate degree of control can be maintained by the operator through small or greater radius of turning.

A still further object of the present invention is to provide a power steering mechanism for a tractor which may be controlled accurately with a minimum of effort by the operator.

A further object of the present invention is to provide a steerable supporting truck for the front wheels of a tractor, or the like, incorporating both a shock absorber for even loads applied to the front wheels and means for compensating or providing differential movement to the wheels caused by unequal loads applied thereto.

Ancillary to the preceding object, another object of the present invention is to provide a supporting truck wherein the shock absorbing unit can be selectively placed in an operative or inoperative position, as desired, without affecting the ability of the pair of front wheels having differential movement with respect to each other when unequal loads are applied thereto.

Another object of the present invention is to provide a combination power steering, differential wheel mounting and shock absorber arrangement wherein the unit are coaxially mounted in minimum of space.

These and other objects and advantages of the present invention will appear more fully in the following specification, claims and drawings, in which:

Figures 1, 13:
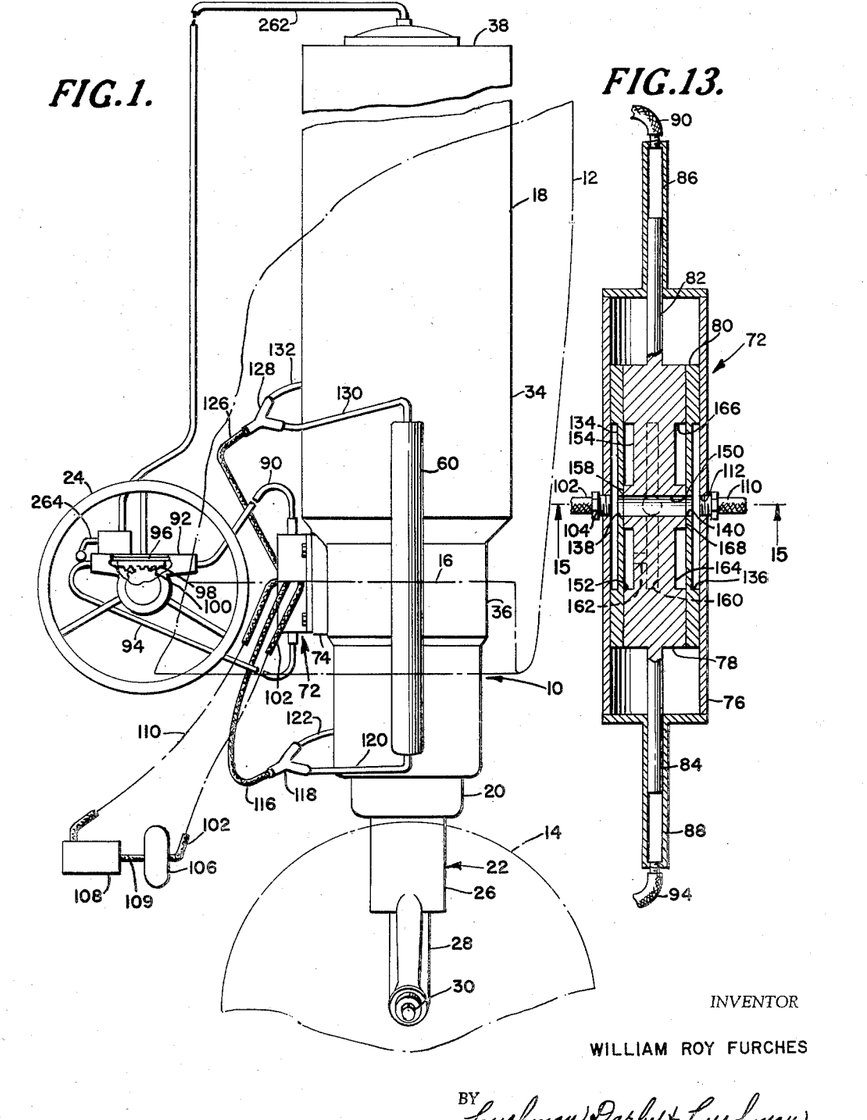
Figure 1 is a side elevational view of the present invention showing the lower forward portion of a tractor in phantom lines and further showing schematically the controls for the power steering apparatus.
Figure 13 is an enlarged sectional view through the power steering pilot valve.

Referring to the drawings, wherein like characters or reference numerals represent like or similar parts, the steerable vehicle supporting truck of the present invention is generally designated by the numeral 10 and is shown in Figure 1 in its relative position on the front of a tractor 12. Only the lower front end portion of the tractor 12 is shown in phantom lines, it being understood that the tractor is of the general arrangement disclosed in the aforementioned patents and consisting of two widely spaced large rear wheels and a pair of closely spaced small front wheels 14. The steerable vehicle supporting truck of the present invention is attached to the front portion of a frame or chassis 16 in any suitable manner, it being understood that the chassis or frame 16 is conventional.

Figures 3, 4:
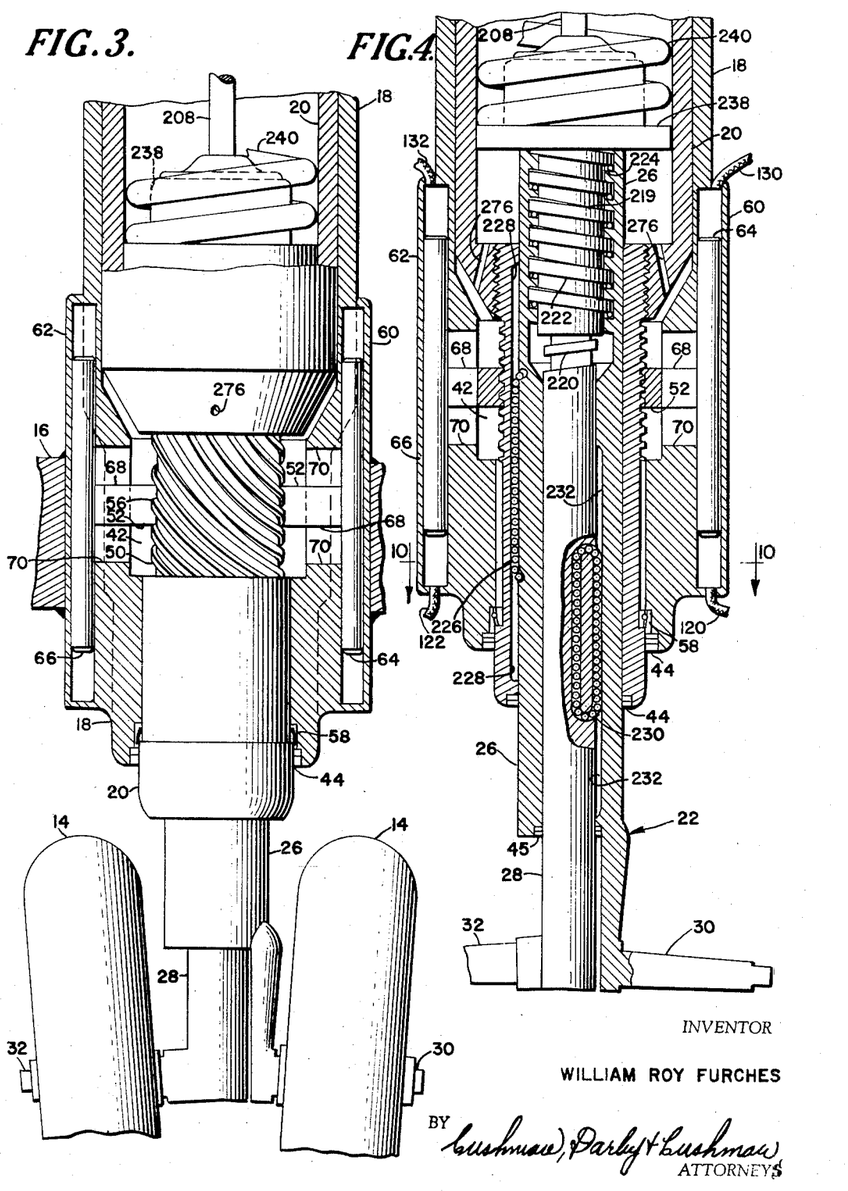
Figure 3 is an enlarged fragmentary view of the lower portion of the truck looking from the front of a tractor, portions of the view being in vertical section and other portions being in elevation.
Figure 4 is a view similar to Figure 3 but showing a vertical section through the portions of the truck shown in elevation in Figure 3.
Figure 8:
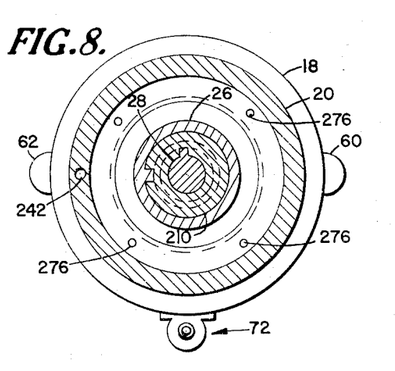
Figure 8 is a sectional view taken on the line 8—8 of Figure 2.

In more detail, truck 10 includes a stationary tubular housing 18 carried by the frame 16 of tractor 12 on a substantially upright or vertical axis, a second tubular housing 20 mounted within the first tubular housing 18 for rotation on the substantially upright or vertical axis and a steering shaft means generally indicated at 22, rotatable with the second housing 20 and supporting the pair of closely spaced front wheels 14. The stationary housing 18 may be bolted to the frame 16 or may be integrally welded to the frame. In general, a steering wheel 24 suitably mounted on the tractor 12 controls the rotation of housing 20 within housing 18 and, thus, the steering of the vehicle wheels 14. A more detailed description will follow later in the specification of the power steering arrangement of the vehicle supporting truck 10 and its control by the steering wheel. Steering shaft means 22 includes an outer tubular shaft 26 extending into housing 20 and an inner concentric shaft 28 also extending into housing 20, as best shown in Figures 3 and 4. Shafts 26 and 28, at their lower ends, have outwardly extending axles 30 and 32 respectively for receiving the wheels 14. The axles 30 and 32 may be on the same horizontal axis or may be so arranged as to mount the wheels on a slightly inclined axis so that the wheels toe in. Shafts 26 and 28 are capable of vertical movement with respect to housings 18 and 20, and further, shafts 26 and 28 are capable of differential movement with respect to each other. If the tractor 12 encounters a bump wherein an even load is applied to both wheels 14, then the shock absorber unit will permit both shafts 26 and 28 to move vertically upwardly within the housing 20 to compensate for the shock. On the other hand, if one wheel strikes a bump, thus, applying load to the one wheel, the wheel will rise and its shaft will also rise within the housing 20 but the other shaft, carrying the other wheel 14, will move downwardly an equal amount of distance so that in effect the one wheel which strikes a rise in the ground will move only one-half of the distance to compensate for the rise in the ground. This will maintain the front end of the tractor stable when traveling over rough terrain.

Figures 2, 5, 6, 7:
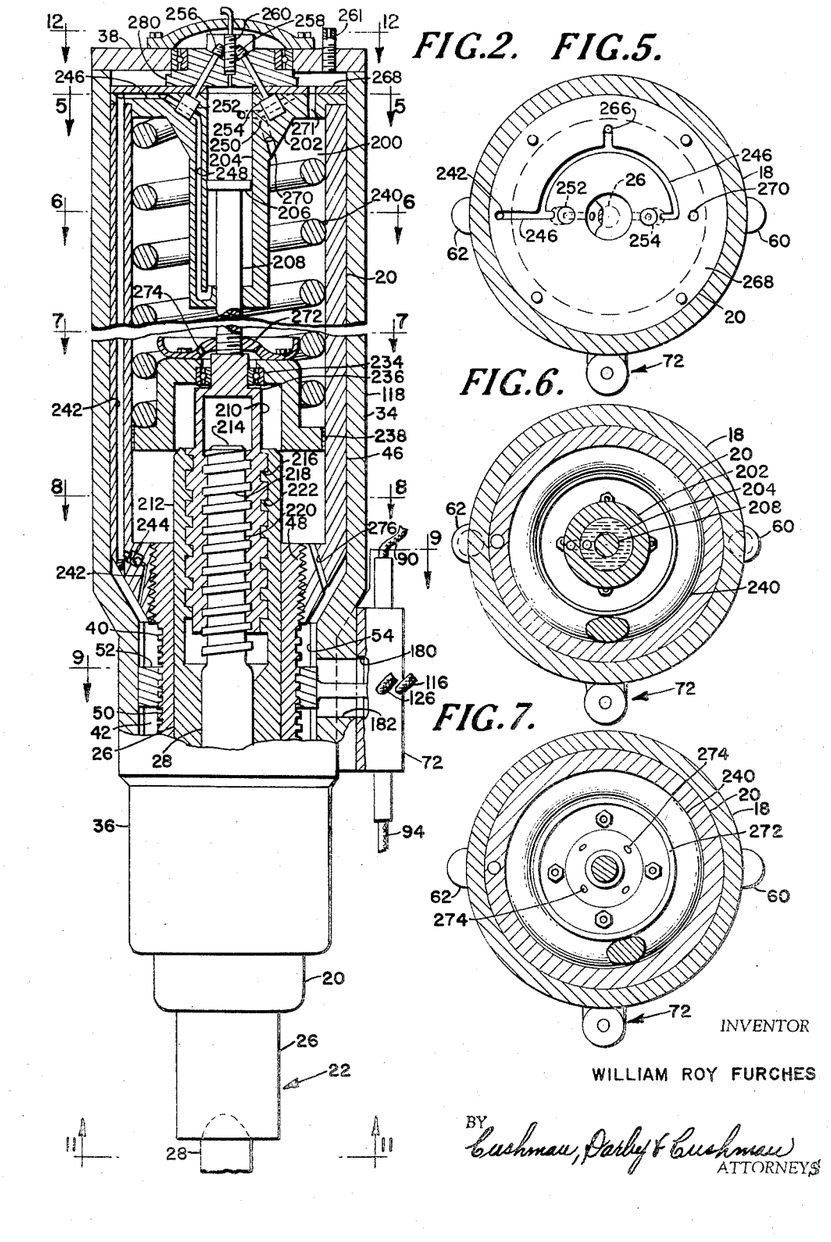
Figure 2 is an enlarged fragmentary side view of the wheel mounting truck showing portions of the truck in vertical section and other portions in elevation.
Figure 5 is a view taken on the line 5—5 of Figure 2.
Figure 6 is a sectional view taken on the line 6—6 of Figure 2.
Figure 7 is a sectional view taken on the line 7—7 of Figure 2.

Referring now to Figures 1 to 4 inclusive, the outer stationary housing 18 of the supporting truck 10 is generally cylindrical, having an upper portion 34 of larger diameter than a lower portion 36. The housing 18 is open at its lower end so that a portion of the housing 20 may extend therefrom while its upper end is closed by a removable cap member 38. The inner or second housing 20 is of substantially the same cylindrical shape as the housing 18 with the diameter of its upper portion being substantially equal to the inside diameter of the upper portion 34 of outer housing 18. However, the lower portion 40 of housing 20 has an outside diameter substantially less than the inside diameter of the lower portion 36 of outer housing 18 so that a chamber 42 is provided between the outer and inner housings 18 and 20, the chamber 42 being an oil reservoir for the shock absorbing mechanism. Suitable oil seals 44 are provided between housing 18 and housing 20, where housing 20 extends out of the lower end of housing 18 and between the housing 20 and the shaft 26. Also an oil seal 45 is provided between shafts 26 and 28, as shown in Figure 4. The lower portion 40 of housing 20 may be a separate piece from the upper portion 46, as shown in Figure 2. The lower portion 40 is threaded into the upper portion 46, as indicated at 48.

Figure 9:
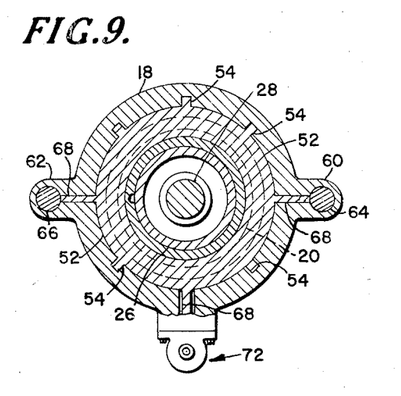
Figure 9 is a sectional view taken on the line 9—9 of Figure 2.

As best shown in Figures 2, 3 and 4, the lower portion 40 of housing 20 is provided with external threads 50. A slide nut 52 splined to the outer casing 18, as indicated at 54, is adapted to move vertically with respect to the casing 18 (Figures 2 and 9). Slide nut 52 has internal threads 56 which are complementary to the threads 50 on the lower portion 40 of housing 20 and, thus, when the slide nut 52 is moved vertically with respect to the housing 20 it will cause the housing 20 to rotate about its substantially vertical axis. A suitable bearing 58 is provided between housing 18 and 20 so that they may rotate freely with respect to one another.

Housing 18 is provided with a pair of oppositely disposed cylinders 60 and 62, the cylinders having double-acting pistons 64 and 66 respectively. Each of the pistons 64 and 66 are provided with a lug 68 extending inwardly through a cut-out portion 70 in casing 18 and are attached to the slide nut 52. Pistons 64 and 66 are movable in the cylinders on an axis parallel to the axis of the housings 18 and 20 and thus, when the pistons are moved, they will move the slide nut 52 vertically in its splines 54, thereby causing rotation of the inner housing 20 on the substantially upright or vertical axis.

Pistons 64 and 66 are operated by fluid-pressure selectively supplied to either end of the pistons by a pilot valve 72 mounted on a boss 74 provided on the outer housing 18. Referred now to Figures 13, 14 and 15, pilot valve 72 is a four-way valve provided with an outer casing 76, an inner slidable valve element 78 and a follow-up sleeve element 80 concentrically positioned between the outer casing 76 and the slidable valve element 78. Slidable valve element 78 is provided on each of its ends with piston members 82 and 84 respectively, the piston members extending into cylinders 86 and 88 respectively, provided on the ends of the casing 76.

Cylinder 86 is connected by a conduit 90 to one end of a cylinder 92 mounted adjacent steering wheel 24, while cylinder 88 is connected by a conduit 94 to the other end of cylinder 92. A piston 96 mounted in the chamber of cylinder 92 is provided with a rack 98 adapted to cooperate with a pinion 100 mounted on the steering wheel 24. Lines or conduits 90 and 94 are filled with a hydraulic fluid, such as oil or the like, and, thus, any movement of the piston 96 in cylinder 92, as caused by turning of the steering wheel 24, will in turn, cause movement of the slidable valve element 78 within the casing 76.

Figure 15:
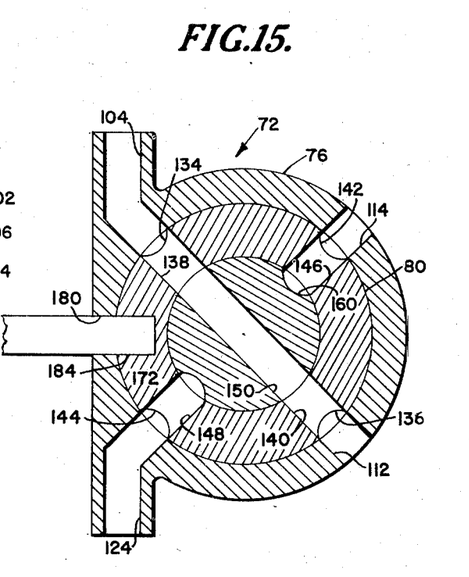
Figure 15 is a sectional view taken on the line 15—15 of Figure 13.

As shown in Figures 1, 13 and 15, a conduit 102 connects a port 104 in the casing 76 with the outlet side of a hydraulic pump 106. Pump 106 may be operated off the conventional power take-offs of the tractor or it may have a separate source of power. A reservoir 108 connected to pump 106 by a conduit 109 supplies hydraulic fluid to the pump 106. A second conduit 110 extending from a port 112 in casing 76 of valve 72 returns hydraulic fluid to the reservoir 108. A port 114 in outer casing 76 of pilot valve 72 is provided with a conduit 116 which extends to a Y-fitting 118. A conduit extending from one branch 120 of the Y-fitting is connected to the lower end of cylinder 60 while another conduit 122 extends from the other branch of the Y-fitting and is connected to the lower end of cylinder 62. Another port 124 provided in the casing 76 of valve 72 is connected by a conduit 126 which extends to a second Y-fitting 128. Conduits 130 and 132 extend from the branches of the Y-fitting 128 to the upper ends of cylinders 60 and 62 respectively.

Figure 14:
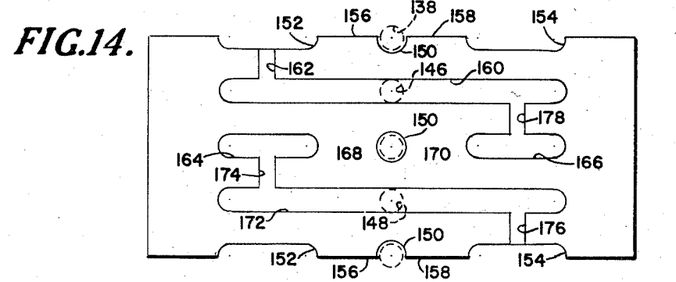
Figure 14 is a layout development of the pilot valve's slide element.

Referring specifically now to Figures 13, 14 and 15, the follow-up sleeve 80 is provided with elongated grooves 134 and 136 on its outer surface, the grooves extending longitudinally of the sleeve and terminating short of each end of the sleeve. The groove 134 is adapted to communicate with the port 104 in the casing 76 of valve 72, while groove 136, which is oppositely disposed on the surface of sleeve 80 from groove 134, is adapted to communicate with the port 112 in the valve casing 76. Sleeve 80 is provided with ports 138 and 140, the ports being oppositely disposed from each other and communicating with the grooves 134 and 136 respectively. Sleeve element 80 is provided with a second pair of elongated grooves 142 and 144 on its outer surface, the grooves 142 and 144 extending longitudinally and terminating short of the ends of the sleeve element and being in alignment or communication with the ports 114 and 124 respectively of the casing. Radially extending ports 146 and 148 communicate with the grooves 142 and 144 respectively and are oppositely disposed from each other.

The slide valve element, which is adapted to slide within the bore of sleeve element 80, is provided with a port or passageway 150 extending diametrically therethrough and capable of aligning with the ports 138 and 140 of the sleeve element. When the port or passageway 150 is in alignment with the ports 138 and 140 respectively, as shown in Figures 13 and 15, hydraulic fluid being pumped from the pump 106 will flow through the valve 72 and be returned by the conduit 110 to the reservoir 108. Under such conditions, the front wheels 14 of the tractor will remain in a fixed position, the position being either to turn the tractor on a constant radius of turn or to guide the tractor on a straight path. A more detailed description of this condition will follow later in the specification.

Valve element 78 is provided with two longitudinally aligned grooves 152 and 154 on its outer surface, the grooves being separated from the port 150 by the lands 156 and 158 respectively. Groove 152 is connected to a longitudinally extending groove 160 by a circumferentially extending groove 162. The groove 160 is in communication with the port 146 in slide element 80. A second pair of short longitudinally extending grooves 164 and 166, in alignment with the port 150 but on opposite sides of the valve element 78, are separated from the port 150 by the lands 168 and 170 respectively. Groove 164 is in communication with a longitudinally extending groove 172 through a circumferentially extending groove 174. It will also be noted that the previously mentioned groove 154 is placed in communication with the opposite end of groove 172 by means of a circumferentially extending groove 176. Groove 166 is placed in communication with the longitudinally extending groove 160 by a circumferentially extending groove 178.

Casing 76 of valve 72 is provided with a longitudinally extending slot 180 on its base which is adapted to align with a slot 182 in the outer housing 18, as best shown in Figure 2. A lug fastened to slide nut 52 and extending through the slots 182 and 180 is connected to the follow-up slide element 80, as indicated at 184 in Figure 15. Movement of the slide nut 52 will cause vertical movement of the follow-up sleeve 80 within the casing 76 relative to the movement of the valve element 78.

The operation of the power steering thus far described may be briefly summarized as follows: The valve 72, when the front wheels of the tractor are in a fixed position, will be in the position disclosed in Figures 13 and 15. As previously mentioned, the continuously operating pump 106 will be pumping hydraulic fluid through the valve 72 and the fluid will be returned to the reservoir 108. In this condition there is merely a re-circulation of hydraulic fluid through the system. When the steering wheel 24 is turned, the closed hydraulic system controlling the valve element 78 will cause the valve element 78 to move vertically in either direction, depending on which way the steering wheel is turned. Assuming the steering wheel is rotated in a clockwise direction, the piston 96 will force the fluid in line 90 against the piston 82 in valve 72. Movement of piston 82 causes the valve element 78 to move downwardly, as viewed in Figure 13. The port 150 in the valve element will become disaligned with the port 138 in the slide element 80 and the groove 154 will become aligned with the port 138. Hydraulic fluid being pumped through the line 102 will flow through the port 138, groove 154, groove 176, to the groove 172 and then out through the port 148 in the slide element 80 to the port 124 aligned with the groove 144. The hydraulic fluid then flows through the line or conduit 126 to the up side of the pistons 64 and 66, moving the same downwardly in their cylinders 60 and 62.

Downward movement of the pistons 64 and 66 causes movement of the slide nut downwardly and since the slide nut cannot rotate on its axis as it is splined to the casing 18, it will cause the housing 20 and the steering shafts 22 to turn. If the steering wheel is held stationary after it has been rotated in a clockwise direction, the follow-up sleeve 80 of valve 72 will also move in a downward direction subsequent to the movement of the slide valve element 78. It will close off the flow of hydraulic fluid to the groove 154 and will realign the port 138 in the sleeve element with the port 150 in the valve element so that hydraulic fluid will be re-circulated through the system. Of course when the valve element 78 has moved to a position where hydraulic fluid is placed on one side or the other of the pistons 64 and 66, the fluid already on the other side of these pistons will be able to return to the reservoir 108 as other passages or grooves in the valve element will be aligned in such a manner as to permit the fluid to return through conduit 110. The follow-up sleeve 80 in valve 72, movable with the slide nut 52, provides the tractor with an accurately controlled power steering arrangement for turning of the tractor in either a large radius of turn or a small radius of turn. As is now evident, if the steering wheel is turned slightly the wheels of the tractor will turn slightly and will immediately stop. There is little chance of over-control as the response to the movement of the steering wheel is substantially instantaneous.

Referring now to Figures 2, 3 and 4, the supporting truck 10 is so designed that the pair of closely spaced front wheels 14 of the tractor may have differential movement with respect to each other to compenate for unequal loads applied thereto or the wheels may move upwardly or downwardly together when an equal load is applied, the shock of the upward or downward movement of the wheels being absorbed. As previously mentioned, the wheels 14 are mounted on coaxial shafts 26 and 28, the coaxial shafts being housed in the inner housing 20. The upper portion of the inner housing 20 is provided with a chamber 200 into which extends the upper ends of shafts 26 and 28. The chamber 200 is closed at its upper end by a cylinder member 202 which carries the shock absorbing chamber 204. The cylinder member 202 has various fluid passages therein for supplying the shock absorbing fluid, such as oil, or the like, to the chamber 204. Chamber 204 is in axial alignment with the vertical axis of the truck unit 10 and is adapted to receive a piston 206 for reciprocation therein. Piston 206 is mounted on the end of a piston rod 208 which extends through the lower end of cylinder member 202 and is connected to a tubular sleeve member 210.

The upper end 212 of tubular shaft 26 is provided with a larger inside diameter than the upper end 214 of the telescoping shaft 28. Left-hand threads 216 are provided on the inside surface of the upper portion 212 of shaft 26, whereas right-hand threads 218 are provided on the outside surface of the upper portion 214 of shaft 28. The tubular sleeve member 210, which has its upper portion connected to the piston rod 208 is provided with internal right-hand threads 220 which are adapted to cooperate with the threads 218 of shaft 28, whereas its outside surface is provided with left-hand threads 222 complementary to the threads 216 of the tubular shaft 26. As is now evident, movement of the shaft 26 in an upward direction will cause the sleeve member 210 to rotate and, since, the threads 222 on the outside of the sleeve member are left-handed and are cooperating with the left-hand threads on the shaft 26, the shaft 26 will move downwardly. Of course the pitch of the cooperating threads of the sleeve with each of the shafts 26 and 28 are of the same pitch so that there will be equal downward and upward differential movement. Bearings 224 (Figure 4) may be provided between the threads so as to permit easy rotation of the sleeve with respect to the shafts 26 and 28.

Figure 10:
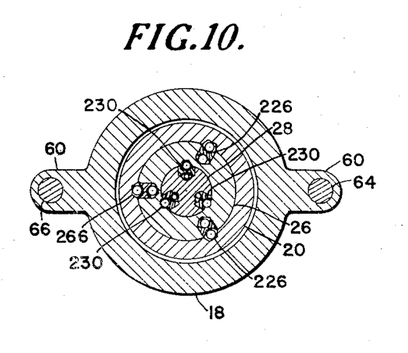
Figure 10 is a sectional view taken on the line 10—10 of Figure 4.
Figure 11:
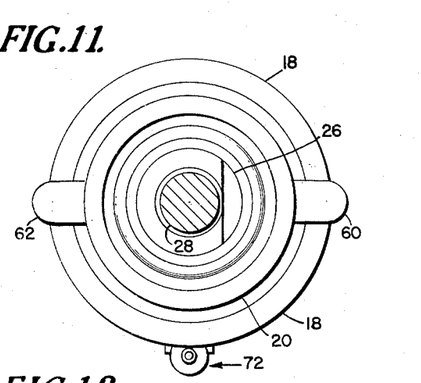
Figure 11 is a view taken on the line 11—11 of Figure 2.
Figure 12:
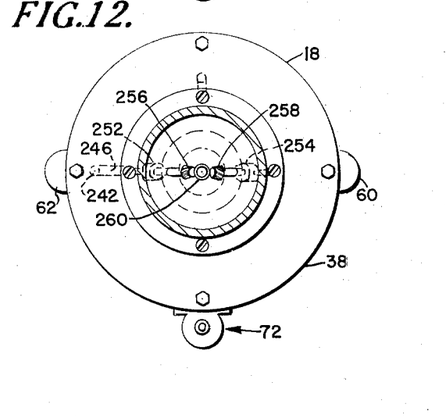
Figure 12 is a view taken on the line 12—12 of Figure 2.

To keep the shafts 26 and 28 from turning on their vertical axis when they are moved vertically, they must be keyed to each other and to the housing 20. As best shown in Figures 4 and 10 an endless raceway 226 of ball bearings is adapted to ride in a vertical groove 228 in the wall of housing 20. On the other hand, an endless raceway of ball bearings 230 is provided between the shafts 26 and 28, the ball bearings adapted to follow a vertical groove 232 in the inner wall of tubular shaft 26.

A thrust bearing 234, carried on a shoulder 236 of sleeve 210, supports a dome-shaped spring carrier 238. Spring carrier 238 supports the lower end of a compression spring 240, the upper end of the spring bearing against the lower surface of the cap-like cylinder member 202. Spring 240 normally urges the sleeve member 210 and its piston 206 in a downward direction. Any sharp upward or downward movement of both shafts 26 and 28 will be resisted by the tension of the spring.

As previously mentioned, the area 42 between the lower portion 40 of housing 20 and the lower portion 36 of housing 18 provides a reservoir for the shock absorbing fluid of cylinder member 202. Not only does the area 42 define a reservoir but it also provides operating space for the slide nut 52, as well as a lubricating means for this nut with the threads 50 of the inner housing 20.

A passageway 242 in housing 20, which opens on the tapered surface of the housing is provided with a one-way check valve 244 so that oil can only travel upwardly therethrough. Passage 242, the lower end of which is covered with oil in the reservoir when the reservoir is filled, extends upwardly through the wall of inner housing 20 and terminates at its upper end. A groove 246 in the wall of cylinder member 202 communicates with the passage 242. The groove 246 communicates with an internal passage 248 down through the wall of cylinder member 202 and opens in the chamber 204 below the piston 206. A second internal passage 250 communicating with groove 246 extends through the wall of cylinder 202 and opens into the chamber 204 above the piston 206.

Plug valves 252 and 254 are provided in the fluid passages 248 and 250 respectively, the plug valves being provided with operating stems having pinions 256 and 258 thereon, adapted to cooperate with a movable rack 260. Rack 260 is connected to a Bowden wire 262 which extends to the steering column where an operating handle 264 is provided. The movement of the operating handle 264 will either simultaneously open or simultaneously close the valves 252 and 254. If the valves 252 and 254 are closed oil is trapped on either side of the piston 206 thereby rendering the shock absorbing unit inoperative so that the wheels may only move differentially with respect to each other. On the other hand, if the valves are open both shafts 26 and 28 may move upwardly or downwardly together, their movement being snubbed by the oil in the upper portion of the chamber which is pushed out of the chamber through the passageway 250 and returned to the lower portion of the chamber through the passageway 248, because the check valve 244 will not permit it to be returned to the reservoir. Since the piston rod 208 takes up some of the lower portion of chamber 204, the amount of fluid removed from the upper portion of the chamber 204 is more than can be utilized in the lower portion and consequently the excess must be bled off.

Figure 16:
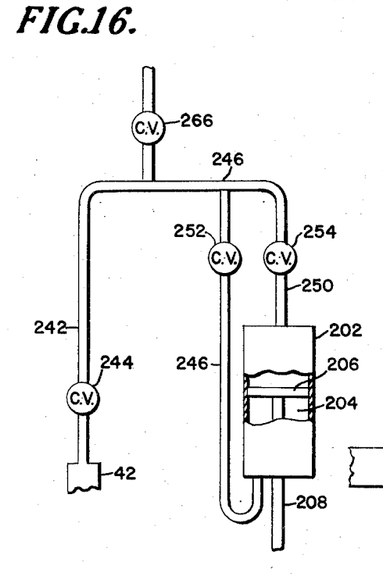
Figure 16 is a schematic view of the flow passages in the steerable vehicle supporting truck from the reservoir to the shock absorber unit.

As shown in Figures 5 and Figure 16, a pressure-reresponsive check valve 266 in the passageway 246 permits the excess oil to be bled to the area above the housing 20. At this time, it must be mentioned that a cap member 268 is provided on top of the cylinder member 202 to hold it in position and to also define the groove 246 as a passageway. A passageway 270, extending through the cylinder member 202 from check valve 266 permits the excess oil to drain down through the spring chamber 200 so as to lubricate the spring, as well as the threads on the sleeve element 210, and shafts 26 and 28. An oil cup 272 provided on the top of the dome-shaped spring carrier 238 has apertures 274 therein so that oil draining down through the unit may be caught and directed onto the bearing 234 so that it too may be lubricated. Oil not caught in the oil cup 272 drains past the spring carrier to the bottom of chamber 200 where it drains through holes 276 in the housing 20, the holes 276 opening to the reservoir area 42.

A breather 261 provided in cap 38 opens the interior of the upper portion of truck 10 to atmosphere. The passageways 271 and 276 provide internal breathing.

The cap 268 for the inner housing 20 is provided with a member 280 which houses the operating arms and the pinions 256 and 258 of valves 252 and 254. A bearing 282 is provided between the member 280 and the cap 38 for the outer housing 18 so that the inner housing 20 may have free rotation with respect thereto.

The operation of the shock absorbing mechanism this far described is as follows: When the tractor 12 is moving over the terrain and strikes an object, such as a rock or the like, where an even load is applied to both wheels 14, the wheels will move upwardly together. The upward movement of the wheels causes both supporting shafts 26 and 28 to move upwardly simultaneously within the housing 20. Since there is no relative movement between the shafts 26 and 28, the sleeve member 210 will not rotate but will be carried upwardly with the shafts and, consequently, will cause the piston to move against the fluid in the chamber 204 above the piston. The fluid in the chamber 204 will flow out of the passageway 250 to the passageway 246 and back down the passageway 248 to the lower side of the piston. Since more fluid will be pushed out of the chamber 204 than taken into the lower portion of the chamber, the excess fluid will drain through the housing 20 to lubricate the moving parts. This excess fluid is released through the pressure-responsive valve 266. Fluid cannot flow downwardly through the passage 242 as the check valve 244 in this passage will automatically close.

Should the wheels drop suddenly, as when dropping into a hole, the shafts 26 and 28 will move vertically downwardly within housing 20 carrying the piston 206 downwardly in the chamber 204. Fluid beneath the piston is forced through the passageway 248 to the upper portion of the chamber 204 but since this portion of the chamber is larger than the portion of the chamber having the piston rod therein, the piston will cause a suction to draw fluid up through the check valve 244 and passage 242 so as to fill the upper portion of the chamber. The one-way pressure-responsive check valve 266 will be closed and will prevent any fluid passing therefrom out into the chamber 200.

If the driver of the tractor does not want to utilize the shock absorber unit, he may lock it in the inoperative position by throwing the control handle 264 so that the Bowden cable will move the rack and cause the valves 252 and 254 to move to a closed position, thus trapping liquid on both sides of the piston.

The mechanism for causing differential movement of the wheels 14 when an unequal load is applied to the wheels is in operation regardless of whether the shock absorbing mechanism is locked in its operative or inoperative position. If an unequal load is applied to the wheels, the wheel receiving the greatest load will move upwardly carrying with it its supporting shaft. Assuming, in Figure 4, that the left-hand wheel moves upwardly, the shaft 28 would also move upwardly within the sleeve member 210. Since the sleeve member 210 is free to rotate unless both shafts 26 and 28 move simultaneously in the same direction, it will rotate on the bearings 234 and its rotation will cause the shaft 26 to move downwardly. By providing a differential movement of the wheels, should a projection, such as a rock of say six inches, be hit by one wheel, that wheel will move upwardly three inches as the other wheel will move downwardly three inches. This differential movement of the front wheels provides lateral stability for the tractor traveling over rough terrain and on the sides of hills. If one wheel drops into a hole, the reverse of above described operation occurs. The shaft supporting the wheel dropping into the hole will move downwardly causing the other shaft and wheel to move upwardly an equal distance.

The terminology used in this specification is for the purpose of description and not limitation, the scope of the invention being defined in the claims.

I claim:

1. In a steerable vehicle supporting truck for tractors or the like, a stationary tubular housing carried by the frame of the tractor on a substantially upright axis, a second tubular housing mounted within said first tubular housing and rotatable on the substantially upright axis, concentric shafts carried within and rotatable with said second tubular housing, said concentric shafts being movable along the substantially upright axis with respect to one another and said second tubular housing, axles extending in opposite direction from the ends of said concentric shafts for mounting wheels of the tractor, means for mounting said concentric shafts for differential movement with respect to each other, and means to cause said tubular housing to rotate on the substantially upright axis whereby the wheels may be steered.

2. A steerable vehicle supporting truck of the character described in claim 1, including means carried in said rotatable tubular housing for absorbing shock caused by simultaneous movement of said concentric shafts along the substantially upright axis.

3. A steerable vehicle supporting truck of the character described in claim 2, including means to lock said shock absorbing means and permit only differential movement of said concentric shafts.

4. In a steerable vehicle supporting truck for tractors or the like, a stationary tubular housing carried by the frame of the tractor on a substantially upright axis, a second tubular housing mounted within said first tubular housing and rotatable on the substantially upright axis, said second tubular housing having a portion of its exterior surface provided with threads, a nut cooperating with the threaded portion of said second tubular housing and movable axially with respect to said second tubular housing to cause the same to rotate on the substantially upright axis, fluid-pressure means carried by said first housing to move said nut, control means to operate said fluid-pressure means, concentric shafts carried within said rotatable housing, means to key said concentric shafts to each other and to said rotatable housing whereby said concentric shafts rotate together with said housing on the substantially upright axis, and axles extending in opposite directions from the ends of said concentric shafts for mounting wheels of the tractors.

5. A steerable vehicle supporting truck of the character described in claim 4, wherein said fluid-pressure means includes a cylinder carried by said first housing and having a chamber therein, a double-ended piston in said chamber, said piston being operatively connected to said nut.

6. A steerable vehicle supporting truck of the character described in claim 5, wherein said control means includes a valve for selectively supplying fluid-pressure to the ends of the piston in said cylinder, said valve also including means connected to said nut for closing said valve after said nut has moved a predetermined distance.

7. A steerable vehicle supporting truck of the character described in claim 4, including means to cause said concentric shafts to move differentially with respect to each other when a differential load is applied to the wheels.

8. A steerable vehicle supporting truck of the character described in claim 7, including means to absorb shock when said shafts move axially and simultaneously in the same direction by an equal load being applied to each of the wheels.

9. A steerable vehicle supporting truck of the character described in claim 8, including means to selectively cause said shock absorbing means to be inoperative and operative.

10. In a steerable vehicle supporting truck for tractors or the like, a stationary tubular housing carried by the frame of the tractor on a substantially vertical axis, a second tubular housing mounted within said first tubular housing and having a portion extending from the lower end of said first tubular housing, said second tubular housing having its lower portion of reduced diameter with respect to the inside diameter of the lower portion of said first tubular housing and thereby defining a chamber for a liquid reservoir, a cylinder carried within the upper portion of said second tubular housing and having a chamber therein in axial alignment with the axis of said second tubular housing, concentric shafts mounted in said second tubular housing, each of said concentric shafts having axles thereon at their lower ends, said axles extending in opposite directions for supporting wheels of the tractors, said concentric shafts being spaced from each other at their upper ends, one of said shafts having internal threads while the other of said shafts having external threads, a sleeve member threaded internally and externally and cooperating respectively with the internal and external threads of said concentric shafts, said sleeve member extending upwardly in said second housing and having a piston rod and piston thereon extending into the chamber in said cylinder of said second housing, said second housing having a fluid passageway leading from the chamber defining the liquid reservoir to each end of the chamber in said cylinder, and resilient means normally urging said sleeve member and its piston in a downwardly direction.

11. A steerable vehicle supporting truck of the character described in claim 10, including valve means in said passageways leading to either end of the chamber of said cylinder, said valve means being selectively operated to close off the passageways to either end of the chamber of said cylinder to thereby trap fluid on either side of the piston in the chamber and prevent movement vertically of said sleeve member.

12. A steerable vehicle supporting truck of the character described in claim 10, wherein one of the threads of said concentric shafts is right-hand and the threads of the other of said concentric shafts is left-hand, whereby movement of one of said shafts vertically with respect to the other of said shafts will cause said sleeve member to rotate and move the other of said shafts vertically in an opposite direction.

13. A truck mounting for tractors or the like, comprising, a housing mounted on the frame of the tractor on a substantially vertical axis, a tubular shaft carried in said housing and having one end thereof extending out of said housing, said tubular shaft having an axle thereon for mounting a wheel, a second shaft telescoping within said first tubular shaft, said second shaft having an axle on its lower end extending in a generally opposite direction to the axle of said first shaft for supporting a second wheel, and means interposed between said shafts whereby when one shaft moves vertically in one direction the other shaft moves vertically in the other direction thereby giving differential vertical movement to the wheels.

14. A truck mounting of the character described in claim 13, wherein the upper end of said tubular shaft is internally threaded with threads traveling in a predetermined direction and wherein said second shaft, at its upper end, is externally threaded with threads traveling in an opposite direction from the threads of said tubular shaft, and wherein said means interposed between said shafts includes a tubular sleeve member having external threads for cooperating with the internal threads of said tubular shaft and internal threads for cooperating with the external threads of said second shaft.

References Cited in the file of this patent

UNITED STATES PATENTS

| | | |
|---|---|---|
| 2,208,600 | Ronning | July 23, 1940 |
| 2,244,853 | Ronning | June 10, 1941 |
| 2,506,093 | MacDuff | May 2, 1950 |
| 2,762,446 | Worthington | Sept. 11, 1956 |